UNITED STATES PATENT OFFICE 2,246,620

WATER PAINT

John F. Comeau, Pine Bush, N. Y.

No Drawing. Application January 6, 1939,
Serial No. 249,655

4 Claims. (Cl. 134—46)

This invention relates to a paint composition and more particularly to a dry mix composition adapted to be added to water to form a paint.

An object of the invention is to provide an improved water paint adapted for general use as a coating for masonry walls and similar surfaces of brick, stone, cement, concrete, and the like.

Another object of the invention is to provide an improved dry mix paint composition, adapted, upon the addition of water, to form a paint characterized by high flowability together with maximum surface coverage per unit volume.

Yet another object of the invention is to provide an improved dry paint composition adapted to be mixed with water to form a paint which will spread easily and uniformly over the surface to which it is applied.

Still another object of the invention is to provide an improved water paint adapted to form a protective coating or surface for cement walls, and the like, which is characterized by close adherence to the base material.

A further object of the invention is to provide an improved water paint composition adapted to form a smooth, closely adherent coating upon the surface to which it is applied.

Yet a further object of the invention is to provide an improved water paint composition which is easy to apply and one that forms a protective coating that will not check or flake off, even after long and extended use.

With these and other equally important and related objects in view, the invention comprehends the concept of coating walls and other surfaces of cement, concrete, stucco, and the like, with a water paint used for decorative and protective purposes.

Heretofore, it has been suggested to make water paints by mixing a plurality of ingredients in dry form with water. It has been proposed, for example, to make a dry paint composition, using cement and high calcium hydrated lime as cementitious substances, together with a suitable filler and water-proofing agent. It has also been proposed to make water paints having a cementitious base, wherein the cement-lime ratio varies from between 2 to 1 and 2.5 to 1, and in some cases the percentage of lime exceeds the percentage of cement in substantially the same ratios, or even more.

While the prior art paint compositions no doubt function for their intended purposes, they are open to several inherent objections. It has been found in the use of water paints of the character wherein a cementitious base is used, that difficulty is encountered in obtaining a mixture of proper consistency, and applying the same to a wall or other surface in a manner so that the composition flows evenly in the form of a dense, closely adherent coating. Even after the addition of sufficient amount of water to the dry mix to provide a free flowing composition, the paints heretofore suggested have been found to lack, in a considerable degree, the property of close adherence to the base material with the result that, after a surface has been coated, the paint checks and flakes off with resultant exposure of portions of the under surface.

In accordance with the present invention, I have provided an improved composition in the form of a dry mix, which, upon the addition of water, provides a free flowing paint of proper consistency for application to a wall or other surface by means of a brush or spray. My improved paint is characterized by close adherence to the base material, and freedom from checking or flaking. While it is intended primarily as a coating or surfacing for the exterior walls of buildings and the like, it may also be used interiorally, and is in fact of general application to surfaces of brick, cement, concrete, and similar materials upon which it is desired to provide a protective surface which is also decorative.

The improved water paint composition of the present invention comprises essentially a dry mix of white cement, white finishing lime, beach sand, zinc sulphate, and calcium chloride, which may be mixed in a suitable mixer and packed in drums or other containers and stored until ready for use. When a suitable quantity of the above dry mixture is added to the requisite amount of water, a paint composition is formed which possesses all the desirable properties of a coating or surfacing material of this character.

As one example of my improved paint composition, the ingredients are mixed, prior to the addition of water, as follows:

| | Per cent |
|---|---|
| White cement | 58.5 |
| White finishing lime | 17.6 |
| Beach sand | 9.3 |
| Zinc sulphate | 1.6 |
| Calcium chloride | 13.0 |

The cement base which I prefer to use is white Portland and it should be of a water-proof variety, however, any commercial type of white cement may be used with a suitable water-proofing material. The lime improves the workability of the paint, maintains its whiteness and also functions as a binding agent. It is preferably a good grade of white finishing lime and may be a high calcium lime, but other types can be used provided it is substantially free of impurities and white in color.

The beach sand is used for the purpose of breaking up the lime, that is, it acts as a separating agent to divide the particles of lime and expose them to contact with the air. The sand also functions as a strengthening agent since it compensates for any loss in strength of the cement due to the addition of lime.

As indicated heretofore, the improved water paint is adapted for general application to masonry walls of various types and for the purpose of adapting it for use on cement, concrete or like surfaces which are not completely aged, that is to say, on "green" walls, zinc sulphate is used as a neutralizing agent for the efflorescence which may be found on the surface to be coated. In this connection it has been found, in the use of many of the prior art water paints, that when they are applied to walls or other surfaces, before the walls have aged, the efflorescence burns the paint and turns it yellow. Due to the action of the efflorescent salts the paint loses adherence with respect to the base material and in addition discolors.

The calcium chloride which is used primarily as a retarding agent to retard setting may, as indicated above, be mixed directly with the other ingredients before adding water to the dry-mix, or it can be packed in separate containers and added to the other ingredients when it is desired to form a paint by the addition of water. As an alternative method, when the calcium chloride is packed separately, it may be added to water and subsequently poured into the mixture of water and the other ingredients of the improved paint composition.

As a specific example of the preparation of a batch of the paint composition, which on the addition of the requisite amount of water, will provide 28-30 gallons of paint, the ingredients used are approximately as follows:

|  | Pounds |
|---|---|
| White cement | 126 |
| White finishing lime | 38 |
| Beach sand | 20 |
| Zinc sulphate | 3.5 |
| Calcium chloride | 28 |

After thoroughly mixing the ingredients in a mechanical mixer, or otherwise, approximately 23 gallons of water are added, after which the mixture is vigorously stirred with a suitable stirring device. The resulting paint composition is then ready for application either by means of a brush or by spraying.

It will be appreciated that the percentages of the various ingredients may be varied within fairly wide ranges without effecting the desirable properties of the resultant product. The cement content may, for example, vary between 55-60%, lime 16-18%, sand 8-10%, zinc sulphate 1-3%, and calcium chloride from between 12 to 14%. It will be understood that pigments may be used to provide a certain definite color of paint, and that deodorants may also be used when necessary.

My improved paint can be applied directly to cement, concrete, and like surfaces without any extended or complicated pre-treatment of the surface which is to be coated. The wall or other surface should be dusted to remove small particles of foreign material, however, with the exception of the usual or normal treatment of a surface before it is painted, no other steps are necessary prior to the application of my paint composition.

It has been found after considerable experimentation, that the paint of the present invention spreads easily with good coverage, and that it drys in approximately 24-48 hours, depending upon the conditions and environment under which it is used. It possesses a high degree of flowability and tends to merge with the base material as an integral part thereof. My improved paint does not lose any of its desirable characteristics when applied under conditions of rapid drying, as in the hot sun, and it is particularly well adapted for use in connection with the surfacing of highway markers and other traffic signals, since it withstands exposure to the elements with concurrent changing temperature conditions, without checking or flaking.

Under certain conditions of use, other substances in small amounts, such as sodium chloride, glue, and terpineol may be added to the preferred form of our dry mixture. For example, a mixture may be made of the following:

|  | Percent |
|---|---|
| White cement | 58.8 |
| White finishing lime | 17.8 |
| Beach sand | 9.4 |
| Zinc sulphate | 1.6 |
| Calcium chloride | 10.0 |
| Glue | .4 |
| Terpineol | .4 |
| Sodium chloride | 1.6 |

As in the preceding example, a mixture of the above ingredients in the percentages indicated is prepared in dry form, to which the required amount of water is added to provide a paint composition. The salt assists in setting the paint and also acts as a bonding agent. The addition of a small amount of glue apparently has a beneficial effect in connection with the arrangement of the solid particles in compact form with uniform distribution throughout the mass, after the water has been added. The terpineol is used primarily to neutralize the odor of the glue and in addition to these substances, suitable coloring matter may be added if desired.

It will of course be understood that the preferred formula may be used with a small amount of sodium chloride without the other addition agents, when it is desired to modify the setting of the paint, or the salt can be omitted and a modified composition prepared using glue, terpineol and the like.

While the preferred modifications of the invention have been described, it is to be understood that these are given merely as examples and I do not wish to limit myself to these precise details. It will be appreciated that within the scope of the concepts herein set forth, other and specifically different but equivalent substances may be used to form a paint which functions in an analogous manner. All such modifications or extentions which are included within the scope of the appended claims are considered to be comprehended within the spirit of the invention.

I claim:

1. A cement-lime water paint characterized by low resistance to the passage of water vapor from the coated surface, containing a mixture of the following ingredients in the proportions named:

| | Percent |
|---|---|
| White cement | 58.8 |
| White finishing lime | 17.8 |
| Beach sand | 9.4 |
| Zinc sulphate | 1.6 |
| Calcium chloride | 10.0 |
| Glue | .4 |
| Terpineol | .4 |
| Sodium chloride | 1.6 |

2. A dry cement-lime mix for a water paint, comprising a mixture of the following ingredients in the proportions named:

| | Percent |
|---|---|
| White cement | 58.5 |
| White finishing lime | 17.6 |
| Beach sand | 9.3 |
| Zinc sulphate | 1.6 |
| Calcium chloride | 13.0 |

3. A cement-lime water paint characterized by low resistance to the passage of water vapor from the coated surface, containing a mixture of the following ingredients in the proportions named:

| | Percent |
|---|---|
| White cement | 52–64 |
| White finishing lime | 16–18 |
| Beach sand | 8–10 |
| Zinc sulphate | 1– 3 |
| Calcium chloride | 7–16 |
| Glue | .3– .5 |
| Terpineol | .3– .5 |
| Sodium chloride | 1– 3 |

4. A dry cement-lime for a water paint, comprising a mixture of the following ingredients in the proportions named:

| | Percent |
|---|---|
| White cement | 52–64 |
| White finishing lime | 16–18 |
| Beach sand | 8–10 |
| Zinc sulphate | 1– 3 |
| Calcium chloride | 8–16 |

JOHN F. COMEAU.